United States Patent
Park et al.

(10) Patent No.: US 11,125,694 B2
(45) Date of Patent: Sep. 21, 2021

(54) METHOD, USES THEREOF AND DEVICE FOR ANALYZING AN ANALYTE USING SURFACE ENHANCED RAMAN SPECTROSCOPY

(71) Applicant: ETH ZURICH, Zurich (CH)

(72) Inventors: Hyung Gyu Park, Gyeongbuk (KR); Ali Altun, Zürich (CH)

(73) Assignee: ETH ZURICH, Zurich (CH)

(*) Notice: Subject to any disclaimer, the term of this patent is extended or adjusted under 35 U.S.C. 154(b) by 37 days.

(21) Appl. No.: 16/611,957

(22) PCT Filed: May 3, 2018

(86) PCT No.: PCT/EP2018/061331
§ 371 (c)(1),
(2) Date: Nov. 8, 2019

(87) PCT Pub. No.: WO2018/206389
PCT Pub. Date: Nov. 15, 2018

(65) Prior Publication Data
US 2021/0080396 A1 Mar. 18, 2021

(30) Foreign Application Priority Data
May 10, 2017 (EP) .................................... 17170361

(51) Int. Cl.
*G01N 21/65* (2006.01)
*G01N 1/28* (2006.01)

(52) U.S. Cl.
CPC ......... *G01N 21/658* (2013.01); *G01N 1/2813* (2013.01); *G01N 2021/651* (2013.01)

(58) Field of Classification Search
CPC ............... G01N 21/658; G01N 1/2813; G01N 2021/651
See application file for complete search history.

(56) References Cited

U.S. PATENT DOCUMENTS 9,036,144 B2   5/2015   Lee et al.
2008/0174775 A1   7/2008   Moskovits et al.
(Continued)

FOREIGN PATENT DOCUMENTS

EP   2 433 102   3/2012
JP   2010-181352 A   8/2010
(Continued)

OTHER PUBLICATIONS

Jacquitta K. Daniels, Nanoparticle-MIrror Sandwich Substrates for Surface-Enhanced Raman Scattering, Sep. 3, 2005, American Chemical Society, pp. 1-7 (Year: 2005).*
(Continued)

*Primary Examiner* — Michael P LaPage
(74) *Attorney, Agent, or Firm* — Sughrue Mion, PLLC (57) ABSTRACT

A method for analysing an analyte (3) using surface enhanced Raman spectroscopy (SERS), comprising the following steps: (a) providing an essentially flat or topologically structured metal surface (1) of a SERS-active metal; (b) depositing the analyte (3) or an open pore matrix material (5) on the surface (1); (c) depositing a multitude of nano-droplets (2) of a SERS-active metal on top of the analyte (3) or the open pore matrix material (5), respectively; and (d) spectroscopically analysing, by scanning laser irradiation and using SERS, the analyte sandwiched between the surface (1) and the multitude of nano-droplets (2). The diameter of the nano-droplets (2) is in the range of 5-70 nm, and the distance between adjacent nano-droplets (2) is smaller than their diameter, and wherein step c) is carried out by PVD or by sputtering SERS-active metal.

31 Claims, 7 Drawing Sheets

(56) References Cited

U.S. PATENT DOCUMENTS

2017/0102334 A1* 4/2017 Zaretski .............. C23C 16/0227
2018/0202903 A1* 7/2018 Chou ..................... G01N 21/76
2018/0246089 A1* 8/2018 Chou ................... G01N 1/2813

FOREIGN PATENT DOCUMENTS

| KR | 10-2016-0021488 A | 2/2016 |
|---|---|---|
| WO | 2015/009239 A1 | 1/2015 |
| WO | 2015/160923 A1 | 10/2015 |

OTHER PUBLICATIONS

Tobias Bremi, Remarks to EPO search report, dated Jun. 18, 2020, pp. 2-5 (Year: 2020).*
Hongyun Guo et al., "Highly efficient construction of oriented sandwich structures for surface-enhanced Raman scattering", Nanotechnology, Jan. 8, 2013, pp. 45608, vol. 24, No. 4.
International Search Report for PCT/EP2018/061331 dated Jul. 20, 2018 [PCT/ISA/210].
Written Opinion for PCT/EP2018/061331 dated Jul. 20, 2018 [PCT/ISA/237].

* cited by examiner

Impurities on the flat gold film are not visible

Impurities on the flat gold film are visible after metallic nano-droplet deposition.

FIG. 12

Raman scanning parameters: 100 x 100 = 10000 pixels
Integration time: 20ms/pixel
Excitation wavelength: 514 nm
Excitation power: 50mW

METHOD, USES THEREOF AND DEVICE FOR ANALYZING AN ANALYTE USING SURFACE ENHANCED RAMAN SPECTROSCOPY

CROSS REFERENCE TO RELATED APPLICATIONS

This application is a National Stage of International Application No. PCT/EP2018/061331 filed May 3, 2018, claiming priority based on European Patent Application No. 17 170 361.4 filed May 10, 2017.

TECHNICAL FIELD

The present invention relates to a method for analyzing an analyte using surface enhanced Raman spectroscopy (SERS), it uses of such a method as well as to a multilayer structure for use in such a method.

PRIOR ART

Identification of the chemical footprint of our physical space is of huge importance for our safety, security and health. As a chemical analysis technique, Raman spectroscopy possesses a number of advantages. It is universal as one can find the Raman spectrum of almost any molecule, virus or bacteria in the literature. It is highly selective as its signal (spectrum) is highly specific to the analyte. Furthermore, compared to other spectroscopic techniques such as high-performance liquid chromatography (HPLC), mass spectroscopy (MS), nuclear magnetic resonance (NMR) and matrix-assisted laser desorption/ionization (MALDI), it is significantly simpler and cheaper. However, the low sensitivity restricts its extensive use as a comprehensive chemical analysis tool.

Surface enhanced Raman spectroscopy (SERS) is an effective method to address the sensitivity issue of Raman spectroscopy. Using metallic nanostructures, SERS can amplify the Raman signals by orders of magnitude. Such a strong enhancement has attracted a large number of researchers to this field in the recent 40 years. However the extensive commercialization of this technology has not been realized yet. The most important challenge is to expand the universe of the analytes that can be detected by SERS. In reality, SERS has been effective if the analyte has a strong affinity to the metallic surface. In other words, SERS can improve the sensitivity, but with a significant cost: loss of universality. U.S. Pat. No. 9,036,144 discloses a method for capturing airborne analytes by using noble metal particles and then depositing the noble metal particles with the captured analytes on a surface. So for a rapid and real-time SERS detection of organic chemicals in the air, colloidal silver and/or gold nanoparticles solution is sprayed, in the form of nano-/micro-sized droplets, at the air where the analytes of interest are present.

EP-A-2433102 discloses a scanning Raman spectrometer for scanning Raman spectra of protein immunoblots or enzyme linked immunosorbent assay procedures. The sensitivity of the measurement is increased by conjugating secondary antibodies used in the Western blot and ELISA methods to surface enhanced Raman Scattering (SERS) labels. The resulting blot or well plate is analyzed with a Raman system that has forms a pixel map of the sample. More specifically, the Raman system generates an effectively line-shaped illumination pattern and scans the sample in the direction perpendicular to the line while the signal is accumulating on the detector. Each pixel is therefore a rectangle defined by the length of the illumination and the distance traveled by the sample within the duration of signal accumulation on the detector. The pixels are sequentially acquired to generate a map of the sample.

JP2010181352 discloses a Raman spectroscopic device capable of stably enhancing Raman scattering intensity, and obtaining a Raman spectrum of a material having a smaller size and a smaller amount. In the Raman spectroscopic device, a sample substrate having an analyte placed thereon is contiguously covered with a metal film and irradiated with laser light, and thereby Raman scattered light is stably enhanced, and the Raman spectrum of the material having a smaller size and smaller amount is obtained.

WO2015009239 discloses a surface enhanced Raman scattering (SERS)-active device which includes at least one SERS-active, topologically patterned nanostructure attached to a substrate, wherein arrangement of the at least one SERS-active nanostructure on the substrate is adapted to provide a surface enhanced Raman signal having an intensity that is tunable depending on (i) orientation angle of the at least one SERS-active nanostructure, (ii) polarization of incident polarized light, or (iii) wavelength of the incident polarized light. An identification tag comprising the SERS-active device, method of identifying an object using the identification tag, and method of manufacturing the SERS-active device are also provided.

KR20160021488 discloses a biochemical material diagnosis platform which comprises: a metal nanoplate; a bioreceptor attached on the surface of the metal nanoplate; a biomarker captured by the bioreceptor; a metal nanoparticle for capping the biomarker; and a spectrum detection unit for analyzing the captured biomarker. Specifically, on the surface chemical capturing moieties (e.g. ABs) are deposited, then the analyte is captured by these capture moieties, and subsequently noble metal particles are attached to the analyte. The platform is capable of detecting the biochemical material with high sensitivity, by sandwiching and fixing the biomarker. Thus it is a quantification tool with chemical identification/selectivity. The identification takes place by way of the selectivity of the capturing and not spectroscopically.

US 2008174775 presents methods of analysis, and compositions relating to such, to determine the presence or absence of an analyte in a sample utilizing a composite substrate which facilitates surface enhanced Raman spectroscopy through the use of 'hot spots' of the form 'metal/analyte/metal'. To this end, very particular topologically structured metal surfaces including pillars in the form of brushes of nanowires are provided onto which the analyte is deposited. These are substrates which contain 'hot spots' of the form 'metal/analyte/metal' and substrates which facilitate the formation of 'hot spots' of the form 'metal/analyte/metal' are presented as well as methods for making these substrates.

HONGYUN GUO et al in "Highly efficient construction of oriented sandwich structures for surface-enhanced Raman scattering; Highly efficient construction of oriented sandwich structures for surface enhanced Raman scattering", NANOTECHNOLOGY, vol. 24, no. 4, 8 Jan. 2013, page 45608, disclose a method in which a topologically structured surface with prismatic silver elevations is generated by using polystyrene nano spheres, subsequent silver deposition and then removal of the polystyrene nano spheres. In the following step chemical linking moiety is attached to the prismatic silver elevations with one of the linking chemical functionalities, and subsequently silver nano spheres are attached to the other linking chemical functionality by immersing the surface in a corresponding silver nano sphere dispersion. A very similar method is disclosed in WO 2015/160923, here the nano spheres are characterized by having protrusions on the nano sphere surface.

SUMMARY OF THE INVENTION

It is therefore an object of the present invention to provide an improved method for spectroscopic analysis using surface enhanced Raman spectroscopy. The proposed method shall be highly sensitive, highly specific and at the same time universally applicable, and shall for example allow fast and cheap reliable spectroscopic analysis e.g. in the food and beverage quality testing, but also in pharmaceutical research as well as medical diagnostics.

Along these lines applicant developed a novel SERS methodology which improves the sensitivity while preserving the universality of SERS. So-called universal surface enhanced Raman spectroscopy (U-SERS) is the core technology described in this application.

Machine-learning algorithms can be combined with U-SERS. By doing so, a sensitive, selective, universal, rapid, affordable and easily calibratable tool can be introduced to perform the analysis of complex chemical mixtures.

More specifically, the present invention relates to a method for analyzing an analyte using surface enhanced Raman spectroscopy (SERS).

The proposed method comprises at least the following steps:

a) providing an essentially flat or topologically structured metal surface of a SERS-active metal;

b) depositing the analyte or an open pore matrix material on said flat or topologically structured metal surface;

c) depositing a multitude of nano-droplets of a SERS-active metal on top of the analyte or the open pore matrix material, respectively;

d) spectroscopically analyzing, by scanning laser irradiation and using SERS, the analyte sandwiched between the flat or topologically structured surface and the multitude of nano-droplets.

The deposition of the analyte can be carried out as a structure of the composition of the analyte for example by introducing the analyte as a function of time in variable composition. It is for example possible to use the outlet of a chromatographic separation device as the analyte source and to carry out the above mentioned steps a)-d) as a function of time. To do that it is possible to deposit a sequence of droplets of the analyte on a corresponding substrate and to carry out the analysis on the spots taking account of the time evolution between the depositions of the spots. It is for example possible to couple the proposed analytical device with a liquid chromatography (LC) or high performance liquid chromatography (HPLC) device as an analyte source. The spectroscopic analysis, by scanning laser irradiation and using SERS, can also be combined, sequentially or concomitantly with other analytical techniques, such as XRF or LIBS, preferably in the same device and same sample space: Raman spectroscopy gives a molecular signal and it can be used to detect organic and inorganic impurities. Metallic impurities can be detected with an elemental-analysis technique such as x-ray fluorescence (XRF), preferably micro-XRF, or laser-assisted breakdown spectroscopy (LIBS). XRF is particularly powerful in detecting high-molecular weight impurities, whereas LIBS is powerful in detecting the low-molecular weight impurities. Operating the elemental analysis module (XRF or LIBS) under vacuum or controlled inert gas conditions eliminates the background signal coming from the elements of air, improving the signal-to-noise ratio.

As concerns the essentially flat or topologically structured metal surface of a SERS-active metal the following: Although flat metallic bottom surface is preferably used as it is reliable and easy to make, one can utilize the following topologically structured metal surface surfaces as well:

Chemically roughened SERS-active metal surfaces; SERS-active metal coated textured surfaces (for example: KOH-etched silicon (silicon pyramids), or faceting of unstable crystal surfaces); SERS-active metal coated lithography-patterned surfaces (lithography can be: optical lithography, e-beam lithography, ion-beam lithography, self-assembly (nanosphere lithography, block-copolymer lithography), nanoimprint lithography); SERS-active metal coated synthesized nanowires (bottom-up synthesis of nanostructures, for example: Carbon nanostructures, metal-oxide nanowires.

A flat metal surface is a metal surface (arithmetical mean deviation of the assessed profile, e.g. according to EN ISO 4287:2000) is in the range of below 20 nm, preferably below 10 nm. In addition to that or alternatively the flat metal surface can be characterised by that the maximum deviation from the average level is less than 15 nm, preferably less than 10 nm.

As concerns the material of the bottom surface, the essentially flat or topologically structured metal surface of a SERS-active metal, the following alternatives are possible:

Conductive metal-oxides: Indium tin oxide (ITO), Aluminum doped Zinc Oxide (AZO), gallium-doped zincoxide (GZO);

Graphene can also be used as the bottom surface.

Advantages of metallic bottom surface over conductive metal oxide or graphene are as follows:

1. Stronger SERS enhancement
2. No background SERS signal (graphene and metal oxides have SERS spectra that may interfere with the analyte spectra).

Therefore if for the essentially flat or topologically structured metal surface reference is made to a SERS-active metal, this shall in the broadest sense include the above mentioned conductive metal-oxides or graphene.

While the base SERS-active metal surface may comprise holes (to e.g. act as a filter or mesh to only withhold analyte structures) it is preferred that the whole surface is covered in a contiguous manner with SERS-active metal and not just certain areas, in particular this base SERS-active metal surface is preferably not formed by individual separated elevations of SERS-active metal between which there is a layer surface which is not metal covered. In particular in cases where the aim is to achieve reproducible detection of impurities in solution samples, so where the analyte is an "impurity", but also in other cases, it may be important to form metal-analyte-metal nano-droplet sandwich structures on all of the analytes deposited on the base surface. To achieve this, the base surface is preferably fully covered with metal in a contiguous manner in the region where analyte is deposited. There should not be any solid part on the surface without metal coating. So that, when a solution sample is evaporated on or filtered by the metal-coated surface, all of the impurities remaining on the surface will have a contact with the coated metal. There preferably should not be any base material region on the surface without metal coating where the impurities can be deposited.

As concerns the analyte, the analyte in principle can be any kind of analyte. Preferably excluded are systems containing or consisting of chemical linker systems which attach, by way of a chemical bond, either to the SERS-active metal base layer an/or to the nano-droplets.

In order to achieve the desired sensitivity, specificity and universality, the number average diameter of the nano-droplets is chosen to be in the range of 5-70 nm, and the number average distance between adjacent nano-droplets is chosen to be smaller than their number average diameter.

The number average diameter of the nano-droplets according to this invention is measured by considering the diameter as visible viewed along the direction perpendicular to the flat or topologically structured metal surface.

The number average distance between adjacent nano-droplets is calculated by in each case taking the shortest distance between adjacent nano-droplets and by calculating the number average thereof.

Of course the above is with the proviso that if an open pore matrix material is deposited on the flat or topologically structured metal surface in step b) the analyte, if not introduced together with the open pore matrix material, is introduced into the pores before step d).

The SERS-active metal of the flat or topologically structured metal surface, of the nano-droplets, or preferably of both, is typically selected from the group consisting of a (elemental) noble metal, preferably silver, gold, platinum, or copper, aluminum, or a mixture thereof or an alloy containing such a metal. Preferred is silver or a silver alloy.

Sodium metal or potassium metal (again in elemental form, not as cations in e.g. an oxide) can also lead to a very strong SERS enhancement (even stronger than Ag). However these metals are very unstable under oxygen. However, if the SERS-scanning machine is placed inside a ultra-low vacuum chamber of the Na or K deposition machine, one is able to use these metals as well. Although putting a Raman system inside a vacuum chamber may sound impractical, it is possible. The Raman system can be built in pocket size.

According to a preferred embodiment, step b) includes a step of deposing the analyte as a solid or also as solution, suspension or emulsion in a carrier liquid (for example by droplet deposition, spin coating, or spraying techniques), and a step of removing the carrier liquid. If there is a carrier liquid the removal is preferably by evaporation, preferably evaporation by elevated temperature (also possible by irradiation or the like) and/or or by reduced pressure, and/or by filtration. If filtration is used preferably the flat or topologically structured metal surface is provided with holes allowing for carrier liquid and non-desired particles to penetrate while keeping analyte particles on the flat or topologically structured metal surface. This technique has the advantage that only the suspended particles of the analyte are kept on the substrate while molecules present in the carrier liquid are removed, which is not always the case if the carrier liquid is evaporated. The result is that of higher specificity and sensitivity and less overlapping undesired signals.

Step c) can be carried out by physical vapor deposition (PVD) or by sputtering SERS-active metal, optionally followed by annealing or accompanied by annealing (for example at a temperature in the range of 40-300° C. and between 1 seconds and 5 minutes). Sputtering SERS-active metal while annealing the sample is also possible, e.g. it is possible to put a small hot-plate in the sputtering machine for this purpose. Preferably the deposition process is carried out until the layer thickness is not more than 50 nm, preferably not more than 30 nm. Most preferred thicknesses are not more than 15 nm and not more than 9 nm The thickness of the metal is typically measured by (i) quartz crystal monitor (QQM) of evaporator machine or (ii) controlling the deposition time according to the thickness/time calibration curves of the sputtering machine.

As a matter of fact by tailoring the deposition process as given above in a self-ordering process highly ordered droplet structures are automatically produced having number average diameter values of little variance and having number average distances between adjacent nano-droplets with little variability. The result is that when carrying out a two-dimensional scan in the spectroscopic process there is only very little variability in the intensity of the measured signals allowing for much higher sensitivity, specificity and universality. Typically the variance in the intensity is less than 20%, or even less than 10%. Preparation of the flat or topologically structured metal layer forming the bottom surface:

For a flat surface: On a silicon wafer/glass wafer glass slip/polymer substrate, an aluminum/copper sheet Cr (or Ti) is coated as a sticking layer (e.g. 3-20 nm thick). Then, Ag (or Au or other aforementioned metals) is coated with a thickness of e.g. 10-300 nm.

The total thickness of the metal should preferably be larger than 20 nm to (i) guarantee a continuous metal film, without voids or holes, and (ii) to eliminate the Raman laser reach the bottom supporting surface (to eliminate the acquisition of the Raman spectra of the bottom supporting surface).

Then, analyte can be deposited on the surface with drop-casting, spin-coating, spraying or filtering. Preferably analyte deposition takes place under vacuum conditions. Vacuum here means that the pressure should up to 800 mbar or up to 500 mbar, and normally should be higher than 20 mbar or higher than 50 mbar. Alternatively, the atmosphere can be an inert gas environment such as $N_2$ or Argon environment where the inert gas such as $N_2$ or Argon is supplied from an ultrapure inert gas ($N_2$ or Argon) tank with a purity level preferably in the range of or even higher than 99.9%. If the evaporation is done within an inert gas environment, the pressure can be higher than 1 atm (1013 mBar). Having over-pressure in the evaporation module is another way to control the cross-contamination as it will eliminate the air flow in to the evaporation module. This is particularly preferred for avoiding cross contamination, for example in a device in which in situ the metal basic layer is created in step a) using sputtering or PVD, under vacuum conditions, and subsequently also the steps b) and c) as well as d) are carried out under vacuum or inert gas conditions.

Drop casting: If the analyte can be dissolved in alcohol, a solvent with the highest vapor pressure is utilized (e.g. acetone). Fast evaporation of the solvent leads to a more uniform analyte deposition, eliminating/minimizing the coffee-ring effect. Coffee-ring effect should be eliminated as the thickness of the analyte needs to be smaller than 1 micron for effective enhancement. To facilitate the fast evaporation, substrate temperature can be raised to 50-80 degrees Centigrade and/or pressure reduced.

After evaporation, the deposited analyte can be annealed at 50-250 degrees for 30 secs-20 mins. This can help the agglomeration and separation of the similar analytes. Eventually, nano/micro size grains of the analytes are formed on the surface. Drop casting method is ideal for small-concentration and small sample volumes (smaller than a few milliliters).

The advantage of this method is (1) simple, and (2) all of the analytes are deposited on the surface (no analyte loss).

Spin-coating: The analyte solution can be spin-coated on the metallic surface. Typically 500-2000 rpm's ramp and 500-3000 rpm spin speed is utilized. The advantage of this method is the uniform coating of the analytes regardless of the solvent evaporation speed (no coffee-ring effect). The drawback of this method is the loss of the analyte during spin-coating. The yield (the percentage of the analyte staying on the surface to the analyte lost during spin coating) depends on (i) analyte molecular mass, (ii) solubility of the analyte in the solvent and (iii) affinity of the metallic surface to the analyte. The deposition yield of the analytes in a solution sample can be different. Therefore, this effect needs to be taken into account in calibrating the measurement for a specific solution sample. This method is ideal for impurity analysis (for example, to analyze the impurity of a pharmaceutical sample).

Spraying: creates tiny droplets on the metallic surface. Evaporation of the solvent of individual tiny droplets can result in a number of small coffee-rings. Multiple small coffee-rings would have a ring thickness smaller than 1 micron, which is sufficient for the effective enhancement of the SERS signal. However, spraying may result in the loss of the analytes. Instead of spraying, micro-dispensing (eg. Utilizing an Ink-jet printer) can also be utilized to eliminate the loss of analyte.

Filtering: This technique is ideal to detect the nano-micro sized particles (polymer particles, pathogens, cells, etc). The size of the pores determines the exclusion of the analytes. The analytes larger than the pores stay on the surface.

As a filter support, a polymeric membrane (polysulfone, polyether sulfone, polyacrilonitrile, polyamide, polyimide, polyethylene, polypropylene, polytetrafluoroethylene, nitrocellulose, cellulose acetate, cellulose esters, polyvinylidenefluoride, polyvinylchloride, etc.) a ceramic membrane (alumina, silicon carbide, zirconia, titania, etc), a sintered metallic membrane or another porous support can be used. The filters can be utilized together as following: a polymeric membrane with a well-defined (controlled) pore diameter can be placed on a support layer with larger pores. The membrane surface is coated by Cr (or Ti) is coated as sticking layer (5-50 nm thick). Then, Ag (or Au or other aforementioned metals) is coated with a thickness of 20-500 nm. The metal coating shrinks the pores of the membrane, determining the size-exclusion limit. On the metal-coated membrane the solution sample can be poured in a continuous manner or dispensed as droplets with a micro-dispenser. The flow rate of the solvent depends on the pore diameter, pore length, and membrane material. In order to facilitate the fast filtering, a larger diameter of the pores can be selected as the pore diameter. The pore diameter at the entrance of the pores can be fine-tuned by the controlling the metal coating thickness. During filtering, the substrate can be spun to increase the solvent flow speed.

Metallization: Onto the deposited analytes, the metal droplets can be coated by either metal evaporation (thermal or electron-beam) or sputtering.

Evaporation: The experiments can be done using the e-beam evaporator (BAK501, Evatec). The sample is mounted on a metallic fixture using double-sided tape. The distance between the metal source and the substrate surface is preferably about 600 mm. The pressure of the chamber is preferably lower than $5 \times 10^{-7}$ Torr. The typical deposition rate is preferably 0.5 Angstroms/sec. In the experiments, the thickness of the metal is preferably between 3 nm and 50 nm, typically less than 30 nm.

Sputtering: The sputtering experiments can be done using (Q150R Rotary-Pumped Sputter Coater). The samples can be placed on the bottom of the chamber to eliminate any damage caused by the Ar plasma. The pressure of the chamber is preferably typically $3 \times 10^{-2}$ Torr. The deposition time is preferably in the range of 1 minute to 6 minutes, which results in a thickness preferably between 5 to 30 nm.

For cells that can be damaged by vacuum can be coated by performing the sputtering at atmospheric pressure. In this case, the vacuum valve and the Argon inlet valve is preferably opened to flush the air with Argon while keeping the pressure high enough to protect cells. Another alternative approach is atmospheric pressure sputtering using an electrode wire.

Raman-scanning: In the experiments, Renishaw inVia Raman microscope is utilized. The typical preferably parameters are as follows: Laser wavelength: 785 nm, laser power: 0.5 mW, integration time: 1 ms, objective lens: ×50, NA=0.75.

The Raman scanning can be performed using an X-Y stage, where the Ag/Analyte/Ag sample moves under the incident Raman laser. As an alternative, the Raman laser can move in a perpendicular direction to the sample stage movement. In such X-Y scanning techniques, the metal/analyte/metal structure can be fabricated in perpendicular shape.

A faster scanning approach is the sample rotation with a translational movement. In this case, either the sample or the Raman laser can do the translational movement. In order to keep the focal area constant over the sample, the rotational speed needs to be tuned with respect to the radial distance from the sample of the sample. In such a rotational scanning technique, the ideal shape of the metal/analyte/metal sample is circular.

As another alternative approach, an oscillating microelectromechanical (MEMS) mirror can be placed under the Raman laser while translating the sample in single axis direction. The laser reflected by the oscillating mirror can map the area as the sample is translated in a direction perpendicular to the mirror oscillation direction. In this case, the metal/analyte/metal sample can be fabricated long semicircular slits so that the reflected beam from MEMS mirror will always possess the identical focal area on the sample surface. This strategy can be combined with a molecular separation technique (e.g. capillary electrophoresis) to study protein mixtures.

For either of the scanning technique, a two-step approach can be applied. First, the scanning is performed using a low-magnification objective lens (e.g. ×5, ×10, ×20) for a fast screening. Then, only the relevant regions (regions providing spectra) can be scanned with a high-magnification (e.g. ×50 or ×100) lens to obtain a detailed and higher resolution data.

After the scanning, quantification of an analyte can be done using two parameters: (1) the number of pixels providing the analyte spectra and (2) the SERS signal intensities. At high concentrations, only the pixel-count data can be sufficient in quantification of the analyte.

At low concentrations, the SERS signal intensities also need to be taken into account.

In case of micro particles or cells the camera image of the relevant pixels can be taken to obtain the morphological information of the particles or cells. The SERS spectra coupled with the morphological information of the cells can be distinctive for the diagnosis of the tumour (cancer) cells.

The spectral data can be post-processed using a processor. However, post-processing hundreds of thousands of spectra may require significant time and computing power. The ideal strategy is the real-time processing of the spectra during acquisition. This can be performed by programming the logic card (e.g. FPGA card) attached to the detection (e.g. CMOS photo sensor). With real-time processing, only the relevant spectra can be sent to the computer for the final post processing.

In step c) nano-droplets of essentially half spherical shape are generated.

The number average diameter of the nano-droplets is typically in the range of 10-60 nm, preferably in the range of 15-50 nm, and/or wherein the number average distance between adjacent nano-droplets is in the range of 1-30 nm, preferably in the range of 5-50 nm.

The thickness of the analyte layer and/or of the open pore matrix material sandwiched between the flat or topologically structured metal layer and the nano-droplets is preferably less than 1 μm, preferably in the range of 1-900 nm, or in the range of 5-100 nm.

The flat or topologically structured metal surface can be a silver and/or gold layer of a thickness in the range of 5-500 run, preferably in the range of 10-100 nm, on a substrate material (for example a silicon dioxide wafer), wherein preferably the roughness of the surface of the flat or topologically structured metal surface is below 50%, preferably below 25%, most preferably below 10% of its thickness or the roughness is less than 100 nm, preferably less than 50 nm, most preferably less than 20 nm.

The analyte can essentially be anything that can be deposited on the metal surface and which can then be covered by the nano-droplets. The analyte can for example be at least one the following: inorganic molecule or particle, organic molecule, including small molecules, DNA molecule, protein, peptide, vitamins, food constituent, cell, including bacterial cells, virus, protozoa, human cells, blood cells, cancer cells, circulating tumor cells.

In step d) an irradiation frequency in the range of 600-900 nm, preferably in the range of 700-800 nm, most preferably in the range of 750-800 nm is used, and wherein further preferably a two-dimensional area is scanned for spectroscopic detection.

The flat or topologically structured metal surface may, in order to act as a filter only keeping the analyte on the surface of the flat or topologically structured metal surface, be provided with a multitude of holes, having a diameter smaller than the analyte particles to be measured, wherein preferably the holes have a diameter in the range of 20-200 nm, most preferably in the range of 50-100 nm.

Step b) may include a step of fixing the analyte on the flat or topologically structured metal surface, preferably by adding a further fixing layer, adding a fixing substance, or by a cross-linking carrier material or added fixing substance either deposited together with the analyte on the flat or topologically structured metal surface or before or after deposition of the analyte on the flat or topologically structured metal surface If an open pore matrix material, e.g. a polymeric material which is expanded, is deposited on the flat or topologically structured surface in step b) the analyte is introduced into the pores before step d), preferably after step c), wherein further preferably the analyte is introduced into the pores from the gas phase by diffusion or in the liquid phase or as a solution by immersion.

The present invention further relates to a use of a method as described above for food and beverage quality testing, pharmaceutical drug discovery, medical diagnostics. A particularly preferred field of use is the use of the method for high-purity water quality testing, for example in the chip manufacturing field. In particular for rinsing of the silicon wafers between two manufacturing processes. The rinsing water is ultrapure water. The impurities of ultrapure water (UPW) can deposit on the surface of the chips, creating defects. Such defects are detrimental for the manufacturing yield and also the reliability of the chips. In order to minimize the chip-defects, the impurities in UPW should be minimized. For this purpose, the impurities of UPW should be monitored be an inline impurity monitoring device. Certain impurity types are associated with certain contamination sources in the filtration and circulation system of ultrapure water. For example, increased silica content in ultrapure water can indicate a crack in the ultra-filtration membranes. Increased boron content can indicate the depletion of ion-exchange resins. Increased carbon content can indicate bio-film formation in the water circulation pipes, degradation of O-rings, or degradation of membrane material.

Furthermore the present invention relates to an analytical device having at least one module for a) generating an essentially flat or topologically structured metal surface of a SERS-active metal, preferably in the form of contiguous layer covering any kind of surface-contamination present on a corresponding base surface;

at least one module for b) depositing the analyte or an open pore matrix material on said flat or topologically structured metal surface;

at least one module for c) depositing a multitude of nano-droplets of a SERS-active metal on top of the analyte or the open pore matrix material, respectively;

at least one module for d) spectroscopically analysing, by scanning laser irradiation and using SERS, the analyte sandwiched between the flat or topologically structured metal surface and the multitude of nano-droplets;

wherein the function of the above-mentioned modules can be carried out by individual units or within joint units, and wherein preferably the module for a) and the module for c) are one same unit.

Furthermore the present invention relates to a multilayer structure for analyzing an analyte using surface enhanced Raman spectroscopy (SERS), comprising the following elements:

a) an essentially flat or topologically structured metal surface of a SERS-active metal;

b) the analyte or an open pore matrix material on said flat or topologically structured metal surface;

c) a multitude of nano-droplets of a SERS-active metal deposited on top of the analyte or the open pore matrix material, respectively, adapted to spectroscopically analyze, by scanning laser irradiation and using SERS, the analyte sandwiched between the flat or topologically structured metal surface and the multitude of nano-droplets;

wherein the number average diameter of the nano-droplets is in the range of 5-70 nm, and wherein the number average distance between adjacent nano-droplets is smaller than their number average diameter.

Again, also here this is with the proviso that if an open pore matrix material is deposited on the flat or topologically structured metal surface in step b) the analyte is introduced into the pores before step d).

The number average diameter of the nano-droplets in such a multilayer structure can be in the range of 10-60 nm, preferably in the range of 15-15 nm, and/or wherein the number average distance between adjacent nano-droplets is in the range of 1-30 nm, preferably in the range of 5-50 nm.

Furthermore the flat or topologically structured metal surface of such a multilayer structure can be a silver and/or gold layer of a thickness in the range of 5-500 nm, preferably in the range of 10-100 nm, on the substrate material, wherein preferably the roughness of the surface of the flat or topologically structured metal surface is below 50%, preferably below 25%, most preferably below 10% of its thickness or the roughness is less than 100 nm, preferably less than 50 nm, most preferably less than 20 nm.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
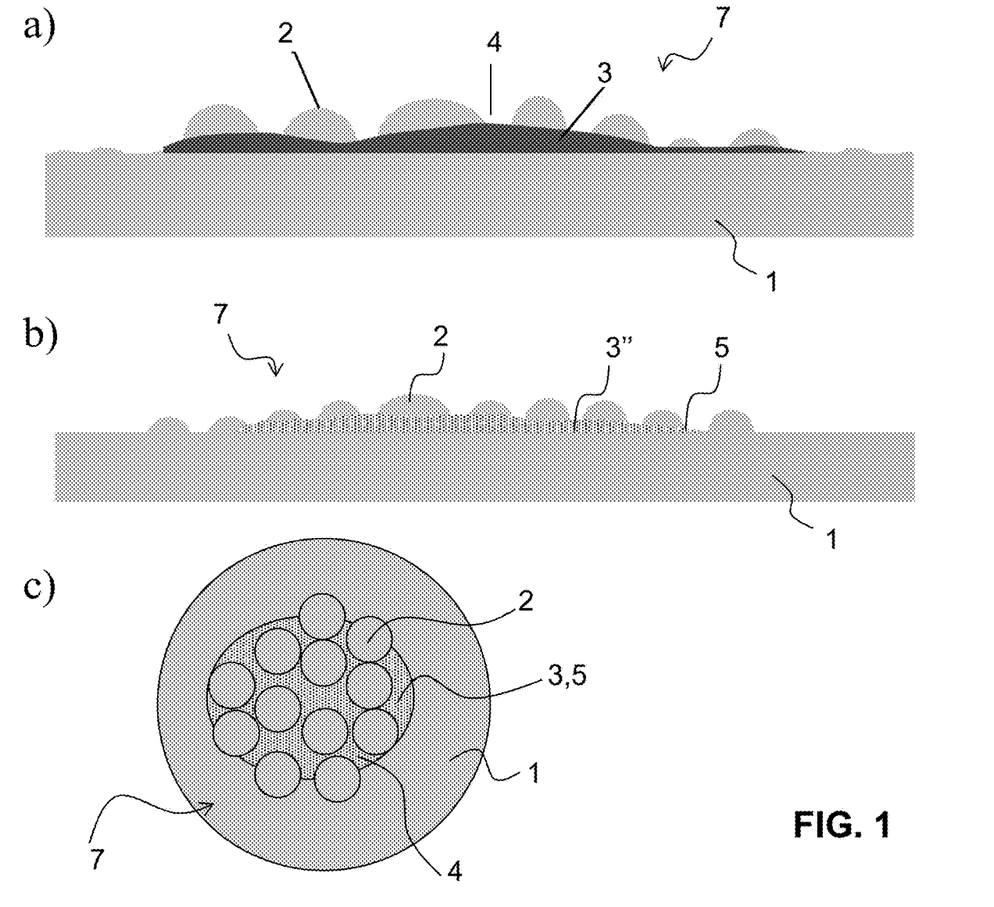
FIG. 1 shows a cross section of Ag/analyte/Ag structure: the core technology of U-SERS, wherein in a) the situation of an evaporated or otherwise deposited analyte sandwiched between the Ag elements is given in a cut, in b) the situation where a porous matrix is sandwiched between the Ag elements, the pores of which matrix can take up the analyte for detection in a cut, and in c) a top view onto such a structure.

U-SERS is based on the Ag/analyte/Ag (Ag: silver) sandwich structure 7 shown in FIG. 1. The structure according to FIG. 1a) comprises a flat Ag thin film 1, a layer of the analyte 3 and Ag nanoislands 2 separated by interspaces 4 can realize a strong electric field enhancement boosting the Raman signals coming from the sandwiched analyte.

FIG. 1b) shows a corresponding sandwich structure 7 in which the sandwiched layer 5 is not the analyte as such, if needed together with a corresponding binder material, but in which sandwiched layer is given by an open pore material layer. Into this open pore material layer the analyte 3" can be penetrated, by diffusion or by immersion.

FIG. 1c) shows a top view onto such a structure, showing that the individual nano-droplets 2 are positioned very close to each other and the average distance between the nano-droplets, which typically have a semi-spherical shape and a rather homogeneous diameter of 30, 40 or 50 nm, depending on the manufacturing process, is significantly smaller than the diameter of the nano-droplets 2.

Figure 2:
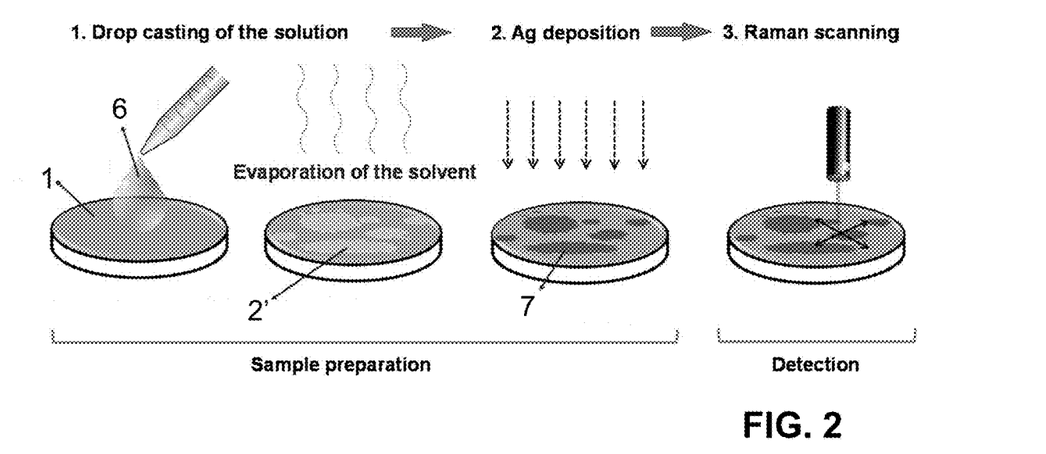
FIG. 2 shows a schematic description of U-SERS procedure; the solution to be analysed is drop-casted over a flat Ag surface; after the evaporation of the solvent, a few nm of Ag is deposited creating Ag/analyte/Ag structures shown in FIG. 1; finally Raman scanning is performed over the surface for the detection.

A possible procedure of making the Ag/analyte/Ag structure is as follows. As shown in FIG. 2, the solution sample is drop-casted on a flat Ag thin-film. Upon drying, the solvent evaporates and the solutes (analytes) are deposited on the Ag surface in random locations. Heat may be supplied to speed up the drying process which can facilitate a more uniform coating of analytes. Then, a few nanometers thick Ag is deposited using sputtering or metal evaporation, forming nanoislands on the analyte layer. Ag nanoisland formation turns the color into a dark tone of blue indicating a strong coupling of light in the red part of the spectra. Indeed, Ag/analyte/Ag structure demonstrates a stronger SERS enhancement for the red excitation laser (785 nm) compared to the green and blue lasers. After the sample preparation procedure, Raman scanning is performed. The distinct blue color of Ag/analyte/Ag structure provides a visual guidance in selecting the areas to be scanned. For the experimental details reference is made to the discussion above.

Figure 3:
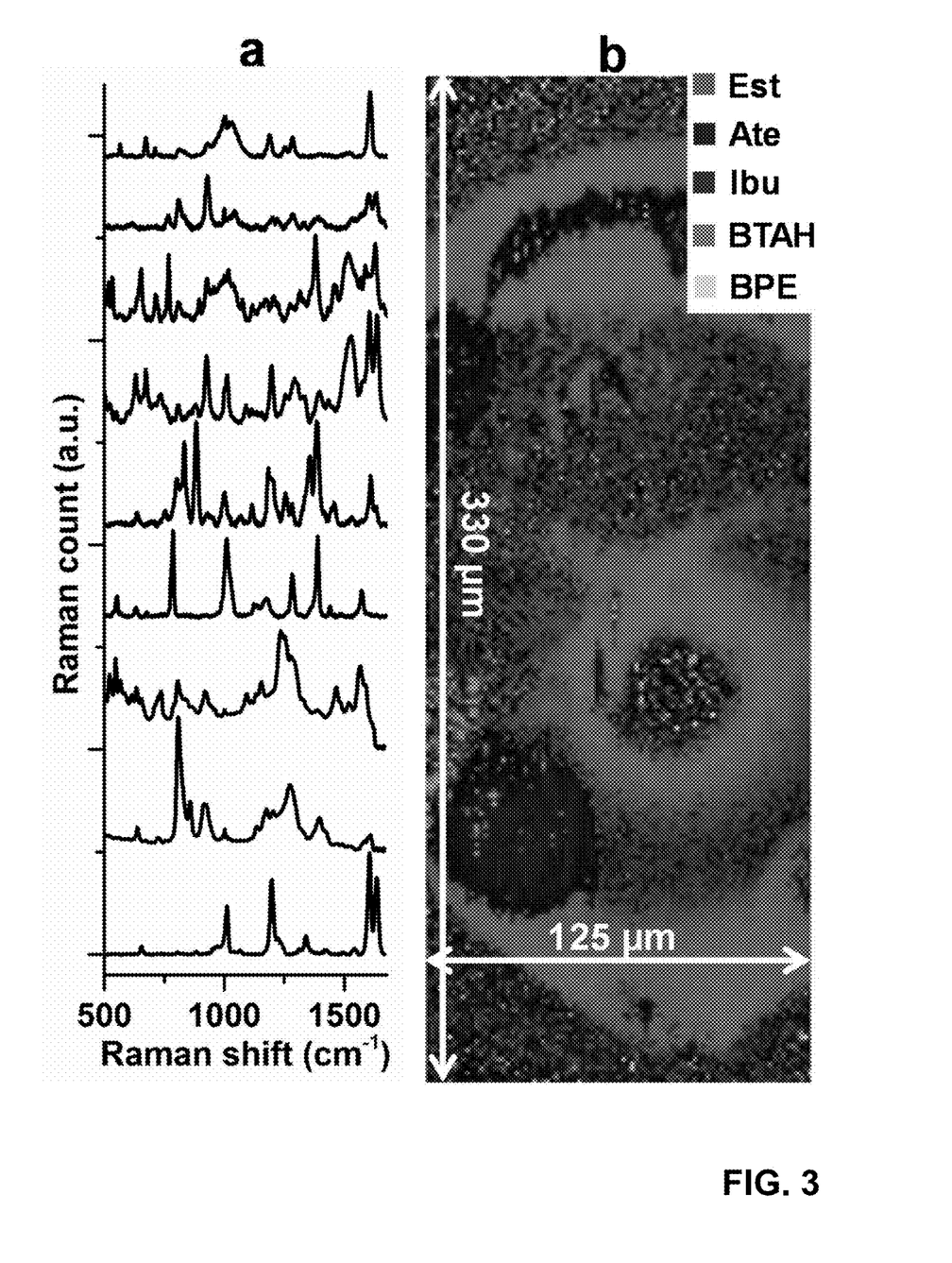
FIG. 3 shows in (a) distinctive SERS spectra of some pesticides and micropollutants (from bottom to top: BPE, Atenolol, Estradiol, BTAH, Ibuprofen, para-Cresidine, 2-Naphthylamine, 1,2-Dichlorobenzene, 4-Aminophenyl disulphide; in (b) U-SERS map of a 1 ml solution mixture with 30 µg Estradiol, 10 µg Atenolol, 5 µg Ibuprofen, 1 µg BTAH and 0.1 µg BPE.

FIG. 3 shows the proof of the concept of U-SERS. The spectra of some pesticides and micropollutants are shown in FIG. 3a. It should be noted that only BPE and BTAH among these analytes have a strong affinity to metal. As U-SERS eliminates the effect of the affinity of the molecule to the metallic surface, we can obtain SERS spectra from any analyte as long as it is not highly volatile.

An important advantage of U-SERS is the ability of the detection of multiple analytes simultaneously. FIG. 3b is an example of such multiplex detection. A solution of five analytes could be resolved easily with a 15-minute-long scan. In the spectral map, each color represents one of the analytes. For the experimental details reference is made to the discussion above.

The area of a gray shading in the map is correlated with the relative amount of the analyte in the mixture. Even the minority species in the solution (BPE) could be detected at some pixels. Increasing the number of pixels in the map would improve the sensitivity and the quantification accuracy.

The sample preparation procedure of U-SERS takes about 5 minutes. The scan time, on the other hand, depends on the number of pixels (or the scan area). The state-of-the-art Raman scanners are limited with a scan rate of about 100 spectra/second. Here, it is important to note that 100 spectra/second is already quite fast for ordinary Raman scanning, as the low intensity of Raman signal requires a longer detection time (integration time) per pixel. However, Ag/analyte/Ag structure amplifies the signals about five orders of magnitude indicating a significant room for improvement of the scan rate.

A U-SERS system should comprise a liquid handling module, a metallization module, and a scanning module.

Figure 4:
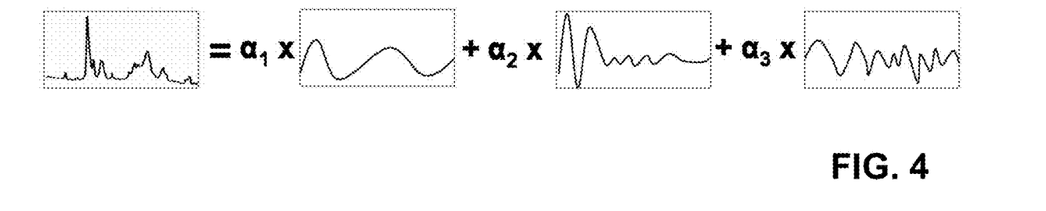
FIG. 4 shows an example of the dimensionality reduction with principle components; a SERS spectrum (left) can be expressed as the linear summation of principle components (three spectra on the right); therefore, the SERS spectrum can be described by only the factors of principle components ($\alpha 1$, $\alpha 2$ and $\alpha 3$) instead of thousands of parameters in terms of SERS intensities and Raman wavenumbers.

State-of-the-art Raman systems perform the data processing after completing the data acquisition. However, post-processing is not a viable strategy, if millions of spectra need to be processed. Target acquisition speed of U-SERS is 10,000 spectra/sec. Such a high scan rate dictates a real-time data processing. Indeed, real-time pattern recognition is a well-established field with various application fields. One example application is the real-time recognition of human face on surveillance cameras. The applicant of this project intends to apply this technology for the real-time processing of SERS spectra. The specific algorithm to be utilized is principle component analysis (PCA). PCA is based on the reduction of the dimension (size) of a spectrum using its principle components. The dimensionality reduction phenomenon is described using a hypothetical example in FIG. 4.

Figure 5:
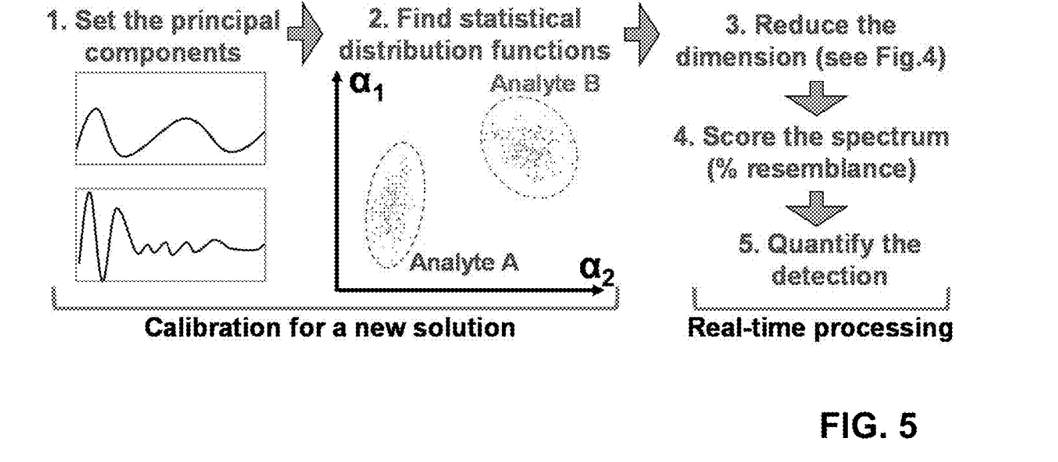
FIG. 5 shows a schematic description of main steps of principle component analysis for real-time analysis of chemical mixtures: (1) Determination of the principle components for a specific solution mixture; (2) Determination of the distribution function of analytes as reference library; (3) reduction of the dimension (see FIG. 4); (4) Quantification of the resemblance of the spectra at a certain pixel to the reference library; (5) Quantification of the spectral count.

In order to apply PCA, the principle components need to be determined first. For the U-SERS experiments, this task is a part of the calibration process for a new solution sample. Each of the analytes in the solution needs be described in terms of a statistical distribution function of the principle components. The calibration of the system for a bi-analyte solution can be performed in less than an hour using U-SERS molecular scanner, which is significantly faster than the state-of-the-art chemical analysis techniques such as HPLC where calibration may take weeks. Having the calibration libraries for the analytes, PCA code will be able to process the data real-time. The steps of a typical PCA algorithm are shown in FIG. 5.

U-SERS contributes to any field requiring a high-performance and affordable chemical analysis technology.

According to market research, three fields are identified as the market: (1) Food & beverage quality testing, (2) pharmaceutical drug discovery, and (3) medical diagnostics.

A bottleneck of the food testing is sample purification time. In a typical sample, together with the possible pesticides, a host of other molecules such as vitamins, amino acids and fats would also reside. Such a complex mixture needs to be purified prior to the HPLC test. The purification process can take two to five days. Due to their short shelf lives, fresh foods are introduced on the shelves of the supermarkets before tests results are obtained. The delay of the quality test results clearly imposes risks on the public health. U-SERS can minimize purification procedure due to its multiplex ability. It can even provide comprehensive information about the content of the food (e.g. vitamin, fat content) together with pesticide contamination.

U-SERS also has a clear potential in pharmaceutical drug discovery where there is a continual effort to develop new HPLC protocols for new solutions. U-SERS with very short calibration time can reduce the overall pharmaceutical drug discovery process significantly. Another area for U-SERS is medical diagnostics. Direct detection of bacteria and virus in the blood is topic for U-SERS applications. Again, the multiplex ability of U-SERS can facilitate the detection of multiple different pathogens while providing additional information about the blood such as the insulin level, combining many different tests into a single U-SERS test.

Figure 6:
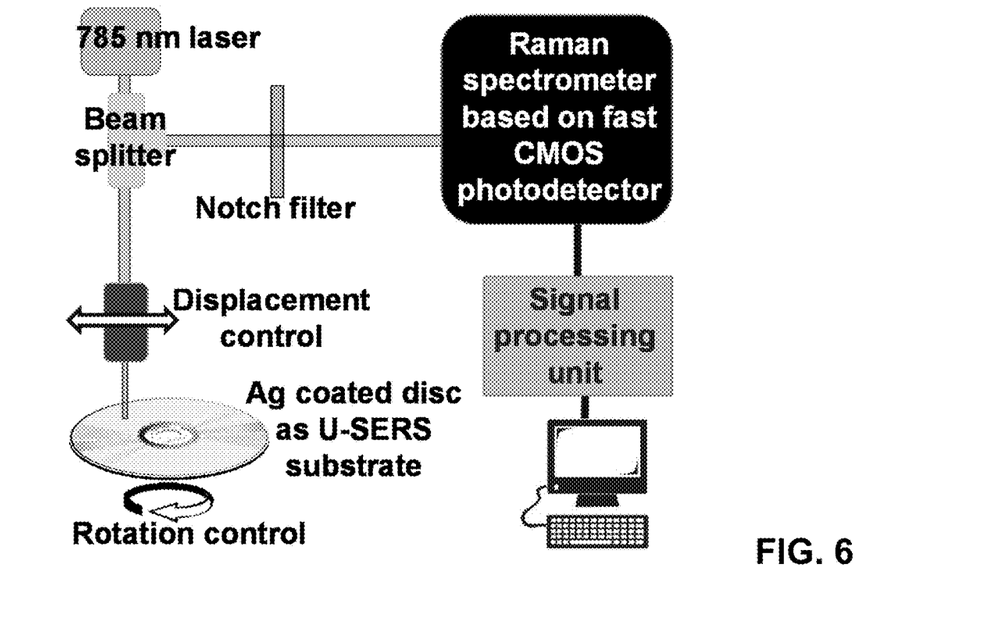
FIG. 6 shows a schematic description of the hardware of U-SERS device

As shown in FIG. 6, the hardware is based on a fast and affordable CMOS type spectrometer. As the SERS signal is already amplified through the Ag/analyte/Ag structure, it is possible to compensate the low-efficiency CMOS photodetector. The rotation control of the U-SERS substrate (Ag-coated CD) and the linear movement control of the objective lens is performed via electronic notice board.

The quantification of analytes is accomplished using two parameters: (i) the number of pixels that a spectrum of a molecule is detected and (ii) the average intensity of certain SERS peaks. At relatively higher concentrations, only the former parameter is sufficient for the quantification.

During sample preparation procedure, the drop-casting may result in a non-uniform analyte coating known as coffee-ring effect when the solvent evaporation rate is not sufficiently high. In this case, instead of using a flat substrate, a slightly tapered well is used. Such a structure leads the formation of thousands of smaller coffee rings which is sufficient for U-SERS measurement.

Although the signal enhancement is universe via U-SERS, some of the analytes have intrinsically larger Raman cross sections. When such a Raman-resonant analyte coexists with another one, the signals of the former can dominate the combined spectra. The machine-learning algorithm is constructed considering such challenges.

Figure 7:
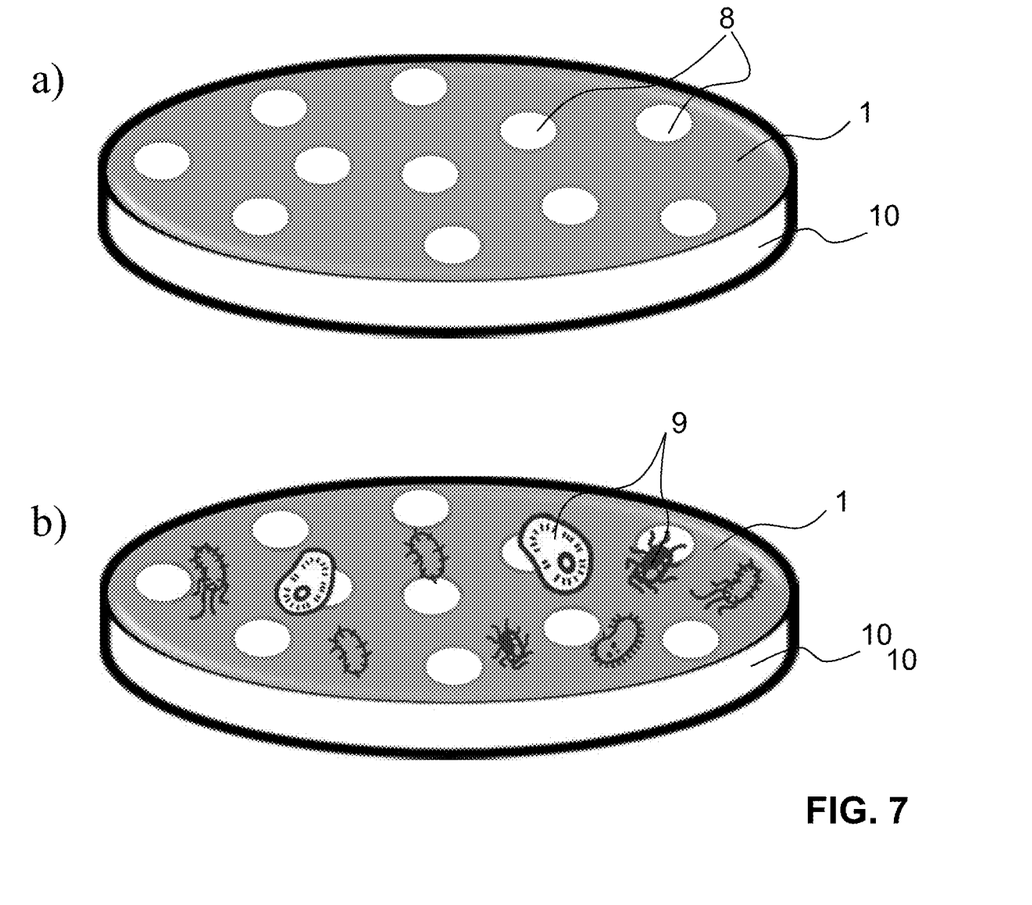
FIG. 7 shows a flat silver substrate can be provided with holes in the sense of a sieve (a), and how the analyte in the form of particles, including bacteria and viruses, can be deposited by allowing a liquid carrying the analyte to pass through the holes keeping the analyte particles on top of the substrate.

FIG. 7 shows how it is possible to provide the substrate with holes 8 of an appropriate size to withhold corresponding particles which one would like to analyse. The particles can be bacteria or viruses, so the substrate can be used as a sieve director, also in a continuous process.

Figure 8:
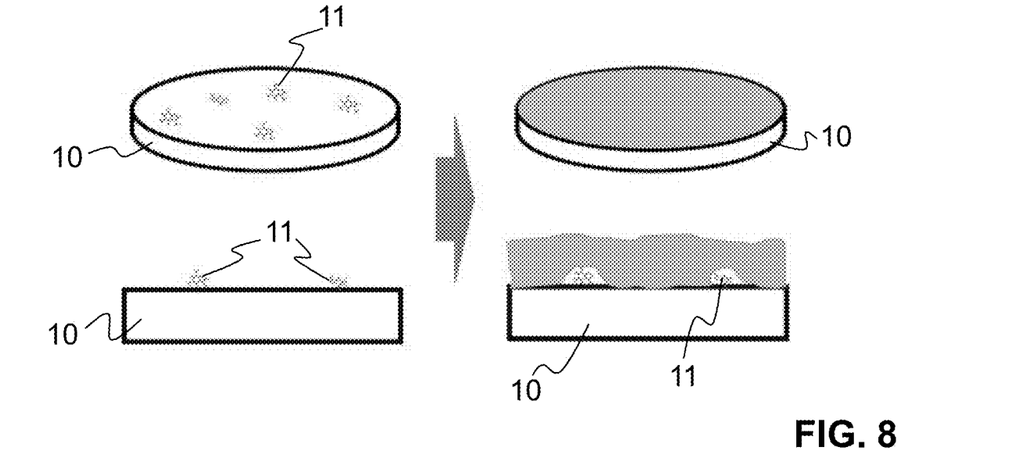
FIG. 8 shows how cross contamination can be avoided by generating the metal surface of a SERS-active metal directly in situ in the analytical device.

FIG. 8 shows how very efficiently cross contamination due to surface impurities on the basic substrate, namely the flat or topologically structured surface before the metal is applied, can be avoided. The backing substrate 10, which may contain surface-contamination 11, is directly in the analytical device coated with a clean bottom metallic film 1. Cross-contamination coming from air can be eliminated in that the evaporation process takes place either (i) under vacuum where the pressure is around or larger than 20 mbars, or (ii) under inter gas, e.g. N2 or Argon environment.

After Raman scanning, one can identify the area of impurities. One can further perform a micro-XRF scanning on the impurities in order to carry out an "elemental analysis" of the impurities. Raman spectroscopy can be used to identify inorganic and organic impurities. With micro-XRF, it is also possible to detect metallic impurities.

Figure 9:
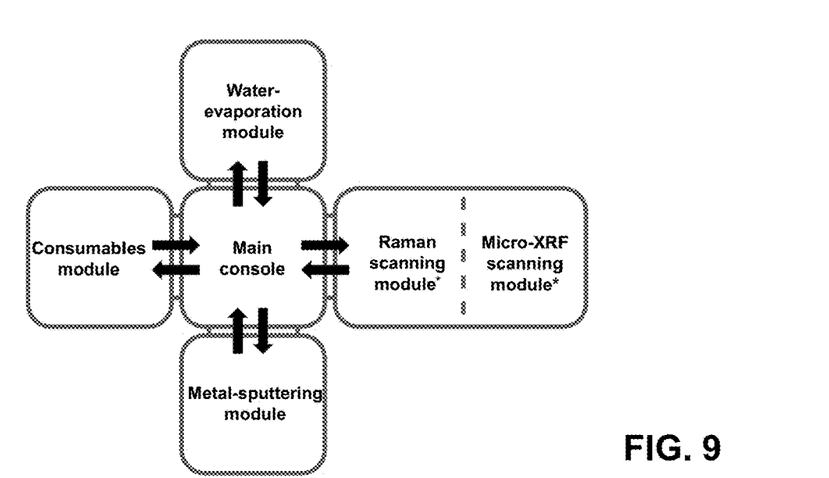
FIG. 9 shows a possible modular set above the analytical device carrying out the proposed method

The actual machine can be composed of different modules, as illustrated in FIG. 9: (1) Sputtering module (2), water-evaporation module, (3) consumables module, (4) Raman scanning module, (5) micro-XRF module and (6) main console for the delivery of consumables between different modules. All of the modules can be under N2 or Argon environment to minimize the cross-contamination.

Figure 10:
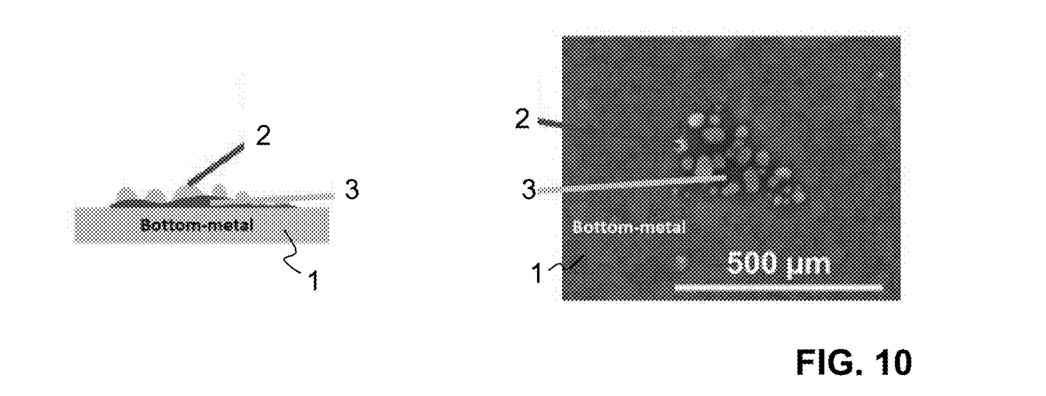
FIG. 10 shows another schematic illustration of the structure for analysis on the left side and a SEM picture on the right side.
Figure 11:
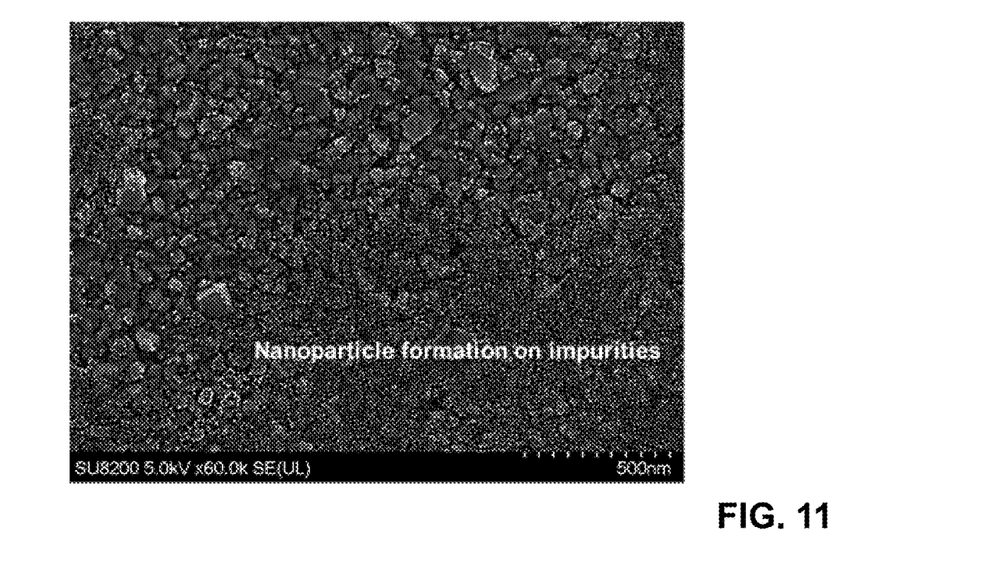
FIG. 11 shows another SEM image showing metallic nano-droplet formation on the location of impurities (analytes)
Figure 12:
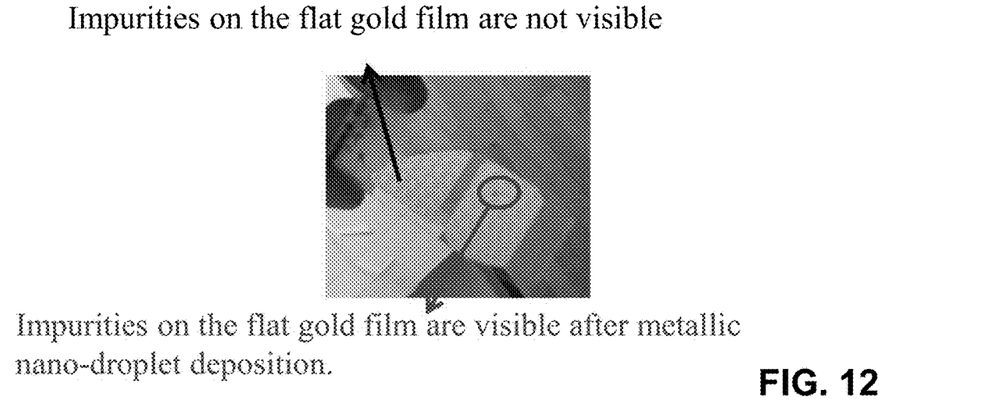
FIG. 12 shows how the metallic nano-droplet formation makes the deposited impurities on the metallic surface visible.

FIG. 10 illustrates, how after metal sputtering (or metal evaporation) of layer 1, nano-droplets 2 of metal are formed only on the location of impurities which are the analytes 2 e.g. in case of water analysis as the surface energy of the impurities are lower than metal. We do not form nano-droplets on the locations where there is no impurity (analyte) exist. It should be noted that this process is chemistry-free (not introducing cross-contamination from chemicals). If we had used colloidal nano particles to form such nanoparticles on the impurities, we would introduce impurities of the colloidal solution. In addition, the nanoparticles are dense and uniformly coated on the impurities. The metallic nano-droplet formation is reproducible as it is based on a reproducible process (sputtering or metal-evaporation). In addition, we do not require a chemical bond between the impurities and the nano-droplets. Processes based on colloidal solutions necessitate a chemical bonding between the deposited impurity (analyte) and the nanoparticles. FIG. 11 further gives another SEM image showing metallic nano-droplet formation on the location of impurities. FIG. 12 shows that depositing metallic nano-droplets on the impurities, the metallic nano-droplet-analyte-metal structure absorbs the light. This changes the color on the locations of impurities. So, the analyte location becomes easily visible. This optical effect facilitates a more efficient Raman scanning.

Figure 13:
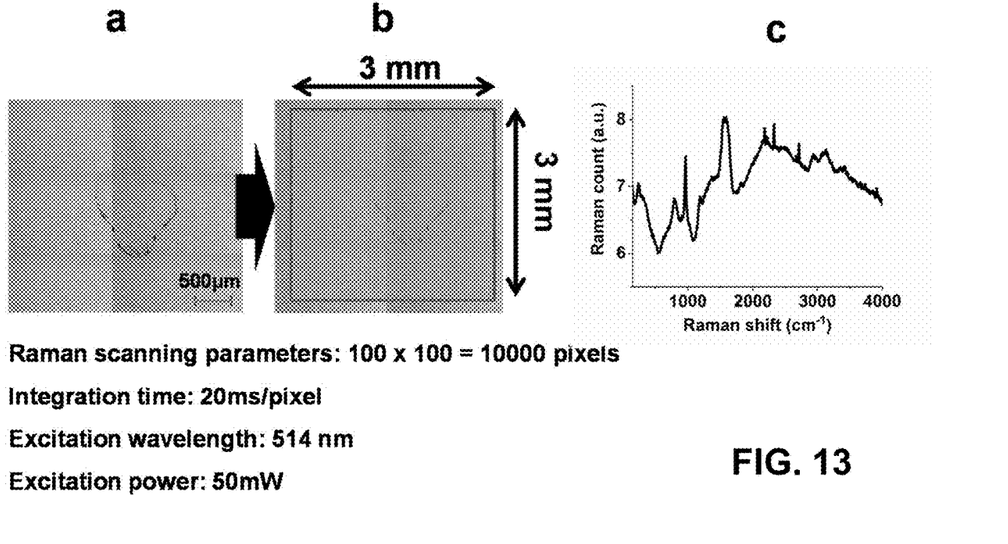
FIG. 13 shows an example of a Raman scanning over impurities of ultrapure water after metallic nano-droplet deposition; wherein in (a) a microscope image of the impurities of 300 microliters of ultrapure water on a gold surface after coating the metallic nano-droplets are given; in (b) the area of the Fast-Raman scanning is given, the parameters for the Raman scanning are described in the figure; in (c) the average Raman spectra of the scan is given, this is the average of 10,000 Raman spectra.

FIG. 13 gives an example of a Raman scanning over impurities of ultrapure water after metallic nano-droplet deposition. (a) Microscope image of the impurities of 300 microliters of ultrapure water on a gold surface after coating the metallic nano-droplets, wherein 6 nm of Ag is coated with 1 angstrom/s deposition rate. (b) Area of the Fast-Raman scanning. The parameters for the Raman scanning are described in the figure. (c) The average Raman spectrum of the scan. This is the average of 10,000 Raman spectra. In this experiment, total silica, total carbon, and total boron concentration in the ultrapure water were 3000 ppt, 1800 ppt and 13 ppt, respectively. At the average spectrum, one can clearly see the bands defining silica (970 cm−1) and carbon (1600 cm−1). However, we can also just see the specific band for boron (boric acid) which is at 814 cm−1.

Figure 14:
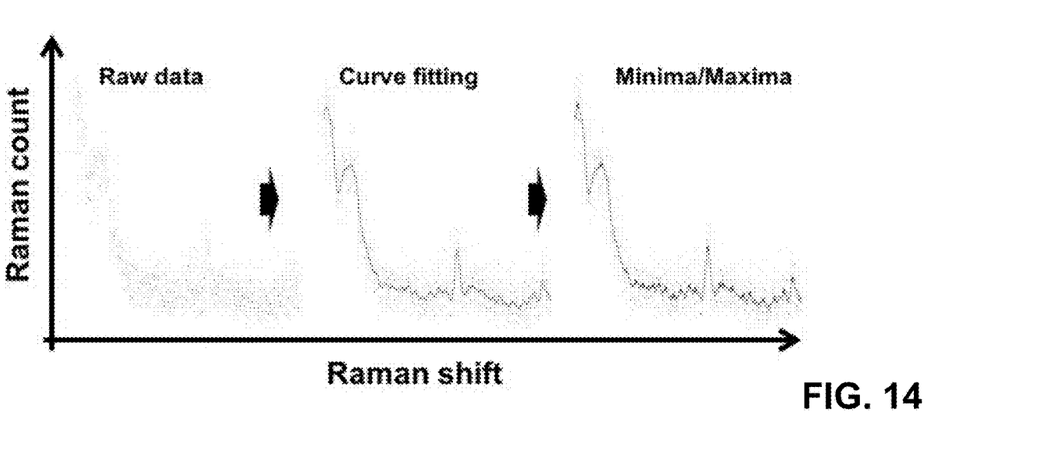
FIG. 14 shows an example of the signal processing to improve signal-to-noise ratio to detect minority impurities.

FIG. 14 shows how we implement a signal processing method in order to make the Raman bands of impurities more visible. This signal processing is particularly useful for the detection of minority species (which is boric acid in this experiment). The spectrum (raw data) of FIG. 14 is a sample spectrum of the 10,000 spectra of the scanned map described in FIG. 12. Similar signal processing is performed on each of these 10,000 spectra to identify the peak locations (in terms of Raman shift) and peak intensities. We use the result of this signal processing method in the procedure explained in the following figure.

Figure 15:
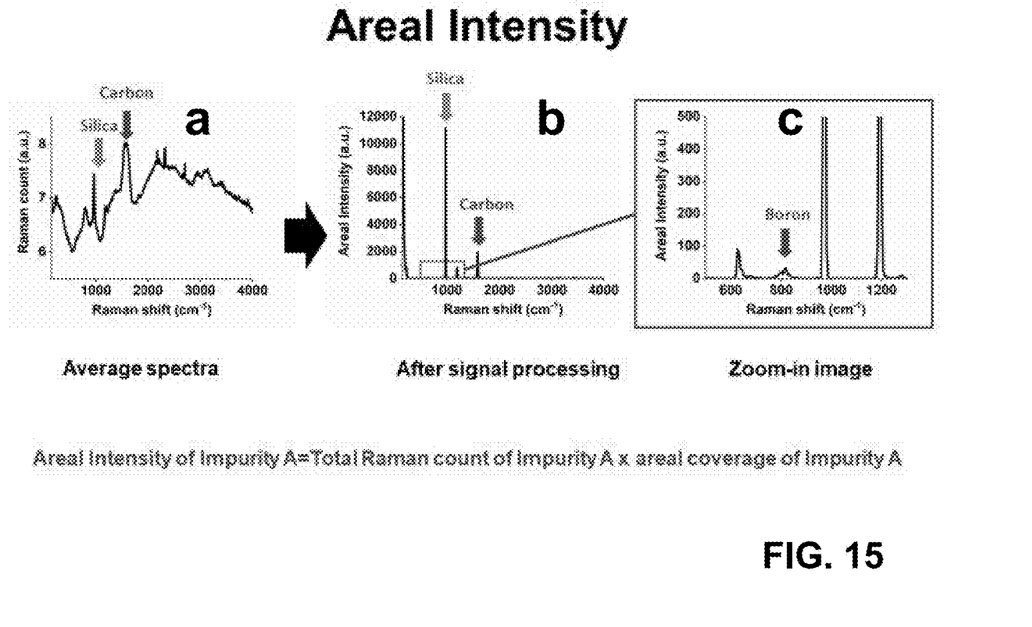
FIG. 15 shows the areal intensity.

FIG. 15 shows, that after the signal processing explained in the previous figure, we can calculate the "Areal intensities", which is the multiplication of the total Raman count and total areal coverage of each of the detected Raman bands. FIG. 15a is the same «average spectrum» as shown in FIG. 13c. FIG. 15b is the «transformed spectrum» after data processing. The y-axis in FIG. 15a is Raman count. The y-axis of FIG. 15b is areal intensity. Areal intensity is the multiplication of the total intensity and the areal coverage of a certain Raman shift over the scanned area. FIG. 15c is the zoom-in image of FIG. 15b, showing the peak describing Boric acid. The representative U-SERS band for boric acid is 814 $cm^{-1}$. When we calculate the Areal intensities, we amplify the Raman bands coming from impurities. This amplification is especially helpful to identify the Raman bands coming from minority impurities. In this experiment, total silica, total carbon, and total boron concentration in the ultrapure water were 3000 ppt, 1800 ppt and 13 ppt, respectively. We were easily able to detect boron (boric acid) after signal processing as we could improve the signal-to-noise ratio significantly. It should be noted that the representative U-SERS band for boric acid, 814 $cm^{-1}$, is hardly visible in FIG. 15a.

Figure 16:
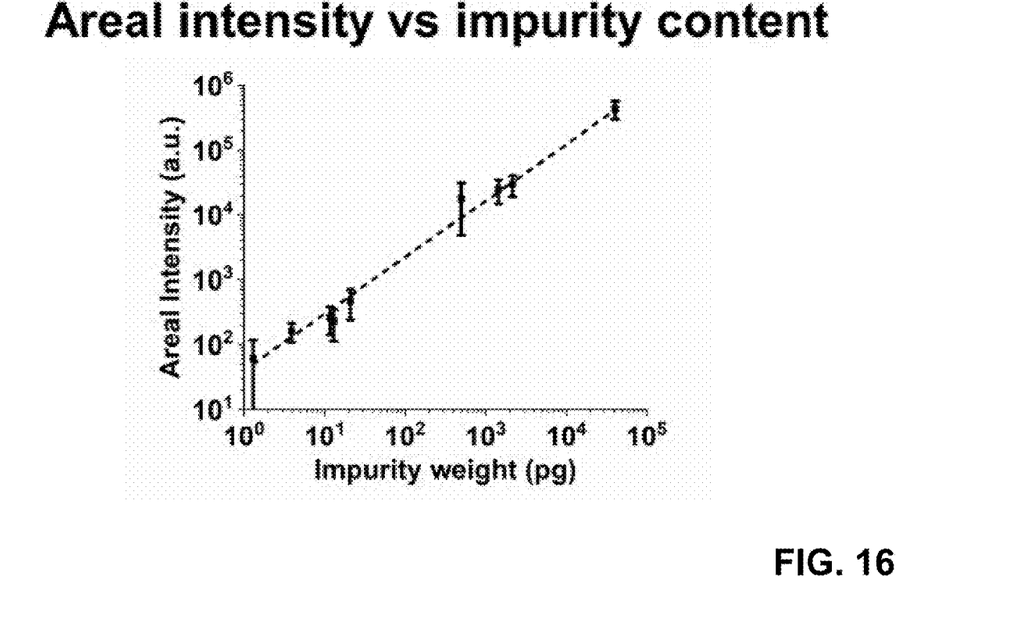
FIG. 16 shows the areal intensity versus the impurity content.

FIG. 16 shows that when we perform the experiment on samples with varying quantities of Boron (boric acid), we can obtain a calibration curve in term of areal intensity of Boron with respect to its weight in the evaporated ultrapure water.

LIST OF REFERENCE SIGNS

| | |
|---|---|
| 1 | flat silver substrate, thin film |
| 2 | silver nano-droplets |
| 3 | analyte |
| 3' | deposited analyte to be detected |
| 3" | analyte in the pores of 5 |
| 4 | interspace between 2 |
| 5 | porous matrix |
| 6 | solution mixture |
| 7 | Ag/analyte/Ag structure |
| 8 | holes in 1 |
| 9 | particles, viruses/bacteria |
| 10 | backing substrate |
| 11 | surface-contamination |

The invention claimed is:

1. A method for analysing an analyte using surface enhanced Raman spectroscopy (SERS), comprising the following steps:
    a) providing a flat or topologically structured metal surface of a SERS-active metal;
    b) depositing the analyte or an open pore matrix material on said flat or topologically structured metal surface;
    c) depositing a multitude of nano-droplets of a SERS-active metal on top of the analyte or the open pore matrix material, respectively;
    d) spectroscopically analysing, by scanning laser irradiation and using SERS, the analyte sandwiched between the flat or topologically structured metal surface and the multitude of nano-droplets;
    wherein the number average diameter of the nano-droplets is in the range of 5-70 nm, and
    wherein the number average distance between adjacent nano-droplets is smaller than their number average diameter, and
    wherein step c) is carried out by physical vapour deposition (PVD) or by sputtering SERS-active metal;
    with the proviso that if an open pore matrix material is deposited on the flat or topologically structured metal surface in step b) the analyte is introduced into the pores before step d).

2. The method according to claim 1, wherein the SERS-active metal of the flat or topologically structured metal surface, of the nano-droplets, or of both, is selected from the group consisting of a noble metal, or copper, sodium, potassium or aluminium, or a mixture thereof or an alloy containing such a metal.

3. The method according to claim 1, wherein step b) includes a step of deposing the analyte as a solution, suspension or emulsion in a carrier liquid, and a step of removing the carrier liquid.

4. The method according to claim 1, wherein step c) is carried out by physical vapour deposition (PVD) or by sputtering SERS-active metal followed by annealing or accompanied by concomitant annealing.

5. The method according to claim 1, wherein in step c) nano-droplets of half spherical shape are generated.

6. The method according to claim 1,
wherein the number average diameter of the nano-droplets is in the range of 10-60 nm, and/or
wherein the number average distance between adjacent nano-droplets is in the range of 1-30 nm.

7. The method according to claim 1, wherein the thickness of at least one of the analyte layer or of the open pore matrix material sandwiched between the flat or topologically structured metal layer and the nano-droplets is less than 1 µm.

8. The method according to claim 1, wherein the flat or topologically structured metal surface is a silver and/or gold layer of a thickness in the range of 5-500 nm, on the substrate material.

9. The method according to claim 1, wherein the analyte is at least one the following: inorganic molecule or particle, organic molecule, including small molecules, DNA molecule, protein, peptide, vitamins, food constituent, cell, including bacterial cells, virus, protozoa, human cells, blood cells, cancer cells, circulating tumour cells.

10. The method according to claim 1, wherein in step d) an irradiation frequency in the range of 600-900 nm is used, and/or
wherein in step d) the scanning laser irradiation and using SERS is carried out by way of scanning in which the laser and/or the analyte sandwiched between the flat or topologically structured metal surface and the multitude of nano-droplets are moved relative to each other, wherein this scanning can be by way of an X-Y scanning, in which the laser and/or the analyte sandwiched are moved in two directions, or can be by way of the analyte sandwiched being rotated combined with a translational movement of the laser, or can be by way of an oscillating mirror placed under the Raman laser while translating the sample in single axis direction, and/or
wherein for the scanning in step d) first, a scanning is performed using a first magnification objective lens for a fast screening and then, scanning is performed using a second magnification objective lens, said second magnification being larger than said first magnification, and/or
wherein before, during or after the analysis in step d), the analyte is analysed, using another analytical technique, including XRF, LIBS, or a combination thereof.

11. The method according to claim 1, wherein the flat or topologically structured metal surface comprises a multitude of holes, having a diameter smaller than the analyte particles to be measured.

12. The method according to claim 1,
wherein step b) includes a step of fixing the analyte on the flat or topologically structured metal surface and/or
wherein, if an open pore matrix material is deposited on the flat or topologically structured surface in step b) the analyte is introduced into the pores before step d).

13. The method according to claim 1 for solvent quality testing.

14. The method of use according to claim 13 for water quality testing, including for high purity water testing, in the chip manufacturing field, food and beverage quality testing, pharmaceutical drug discovery, medical diagnostics.

15. The method according to claim 13 for water quality testing, using one analytical device in which all steps a)-d) are carried out.

16. The method according to claim 1,
wherein the SERS-active metal of the flat or topologically structured metal surface, of the nano-droplets, or of both, is selected from the group consisting of a silver, gold, platinum, or copper, sodium, potassium or aluminium, or a mixture thereof or an alloy containing such a metal, and
wherein further the method is carried out in one analytical device, in which the actual generation of the flat or topologically structured metal surface of a SERS-active metal according to step a), the analyte deposition according to step b), the deposition of the nano-droplets according to step c) as well as the spectroscopic analysis according to d) take place within one same analytical device.

17. The method according to claim 1,
wherein step b) includes a step of deposing the analyte as a solution, suspension or emulsion in a carrier liquid, and a step of removing the carrier liquid,
wherein the removal is by evaporation, including by elevated temperature and/or or by reduced pressure, and/or by filtration, and
wherein in the latter case the flat or topologically structured metal surface is provided with holes allowing for carrier liquid and non-desired particles to penetrate while keeping analyte particles on the flat or topologically structured metal surface.

18. The method according to claim 1,
wherein step c) is carried out by physical vapour deposition (PVD) or by sputtering SERS-active metal, followed by annealing or accompanied by concomitant annealing, and
wherein the deposition process is carried out until the layer thickness is not more than 50 nm.

19. The method according to claim 1,
wherein step c) is carried out by physical vapour deposition (PVD) or by sputtering SERS-active metal, followed by annealing or accompanied by concomitant annealing, and
wherein the deposition process is carried out until the layer thickness is nor more than 15 nm or 9 nm.

20. The method according to claim 1, wherein the number average diameter of the nano-droplets is in the range of 15-50 nm, and/or
wherein the number average distance between adjacent nano-droplets is in the range of 5-50 nm.

21. The method according to claim 1, wherein the thickness of the analyte layer and/or of the open pore matrix material sandwiched between the flat or topologically structured metal layer and the nano-droplets is in the range of 1-900 nm.

22. The method according to claim 1, wherein the thickness of the analyte layer and/or of the open pore matrix material sandwiched between the flat or topologically structured metal layer and the nano-droplets is less than 1 μm, or in the range of 5-100 nm.

23. The method according to claim 1,
wherein the flat or topologically structured metal surface is a silver and/or gold layer of a thickness in the range 10-100 nm, on the substrate material, and
wherein the roughness of the surface of the flat or topologically structured metal surface is below 50% of its thickness or the roughness is less than 100 nm.

24. The method according to claim 1,
wherein the flat or topologically structured metal surface is a silver and/or gold layer of a thickness in the range 10-100 nm, on the substrate material, and
wherein the roughness of the surface of the flat or topologically structured metal surface is below 10% of its thickness or the roughness is less than 20 nm.

25. The method according to claim 1,
wherein the analyte is at least one the following: inorganic molecule or particle, organic molecule, including small molecules, DNA molecule, protein, peptide, vitamins, food constituent, cell, including bacterial cells, virus, protozoa, human cells, blood cells, cancer cells, and circulating tumour cells, and
wherein in case of cells also morphological information is determined in the scanning process of step d).

26. The method according to claim 1,
wherein in step d) an irradiation frequency in the range of 750-800 nm is used, and wherein further a two-dimensional area is scanned for spectroscopic detection, and/or
wherein in step d) the scanning laser irradiation and using SERS is carried out by way scanning in which the laser and/or the analyte sandwiched between the flat or topologically structured metal surface and the multitude of nano-droplets are moved relative to each other,
wherein this scanning can be by way of an X-Y scanning, in which the laser and/or the analyte sandwiched are moved in two orthogonal, directions, or can be by way of the analyte sandwiched being rotated combined with a translational movement of the laser, or can be by way of an oscillating, microelectromechanical (MEMS), mirror placed under the Raman laser while translating the sample in single axis direction, and/or
wherein for the scanning in step d) first, a scanning is performed using a first magnification objective lens for a fast screening and then, only in the regions providing spectra, scanning is performed using a second magnification objective lens, said second magnification being larger than said first magnification, and/or
wherein before, during or after the analysis in step d), the analyte is analysed, in the same device and using the same sample space and preparation, using another analytical technique, including XRF, LIBS, or a combination thereof.

27. The method according to claim 1,
wherein the flat or topologically structured metal surface comprises the multitude of holes, having a diameter smaller than the analyte particles to be measured, and wherein the holes have a diameter in the range of 20-200 nm, or in the range of 50-100 nm.

28. The method according to claim 1,
wherein step b) includes a step of fixing the analyte on the flat or topologically structured metal surface, by adding a further fixing layer, adding a fixing substance, or by a cross-linking carrier material either deposited together with the analyte on the flat or topologically structured metal surface or before or after deposition of the analyte on the flat or topologically structured metal surface, and/or
wherein, if an open pore matrix material is deposited on the flat or topologically structured surface in step b) the analyte is introduced into the pores before step d), after step c), wherein the analyte is introduced into the pores from the gas phase by diffusion or in the liquid phase or as a solution by immersion.

29. A multilayer structure for analysing an analyte using surface enhanced Raman spectroscopy (SERS), comprising the following elements:
a) a flat or topologically structured metal surface of a SERS-active metal;
b) the analyte or an open pore matrix material on said flat or topologically structured metal surface;
c) a multitude of nano-droplets of a SERS-active metal deposited on top of the analyte or the open pore matrix material, respectively,
adapted to be spectroscopically analysed, by scanning laser irradiation and using SERS, the analyte sandwiched between the flat or topologically structured metal surface and the multitude of nano-droplets;
wherein the number average diameter of the nano-droplets is in the range of 5-70 nm,
wherein the number average distance between adjacent nano-droplets is smaller than their number average diameter, and
wherein said multitude of nano-droplets of a SERS-active metal are deposited by physical vapour deposition (PVD) or by sputtering SERS-active metal.

30. The multilayer structure according to claim 29,
wherein the number average diameter of the nano-droplets is in the range of 10-60 nm, and/or
wherein the number average distance between adjacent nano-droplets is in the range of 1-30 nm, or
wherein the flat or topologically structured metal surface is a silver and/or gold layer of a thickness in the range of 5-500 nm on the substrate material.

31. The multilayer structure according to claim 29,
wherein the number average diameter of the nano-droplets is in the range of 15-50 nm, and/or
wherein the number average distance between adjacent nano-droplets is in the range of 5-50 nm, and/or
wherein the flat or topologically structured metal surface is a silver and/or gold layer of a thickness in the range of 10-100 nm, on the substrate material, and
wherein the roughness of the surface of the flat or topologically structured metal surface is below 50%, of its thickness or the roughness is less than 100 nm, or less than 50 nm.

* * * * *